No. 783,989. PATENTED FEB. 28, 1905.
F. W. YOUNG.
APPARATUS FOR THE COMMUTATION OF DIRECT CURRENT DYNAMO ELECTRIC MACHINES.
APPLICATION FILED JUNE 26, 1902. RENEWED SEPT. 12, 1904.
2 SHEETS—SHEET 1.
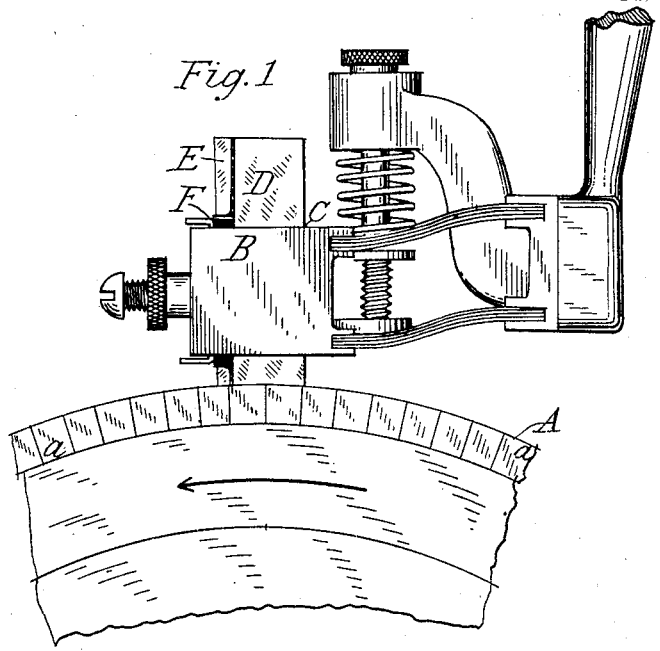
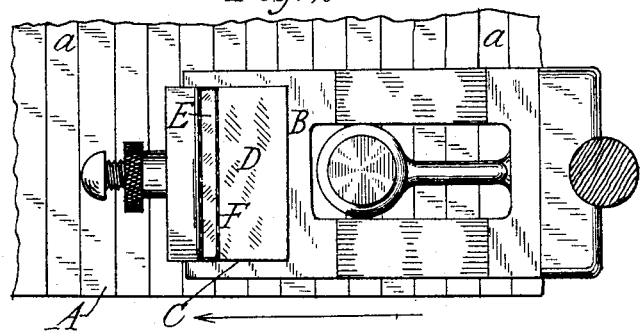
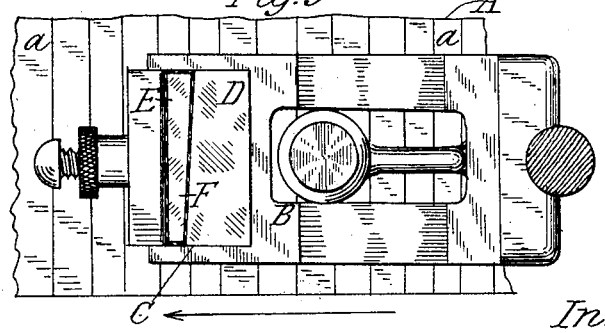
Witnesses:
Edward J. Murphy
Geo. L. Wheelock
Inventor:
Frederick W. Young
by Thomas Ewing, Jr.
Attorney.

No. 783,989. PATENTED FEB. 28, 1905.
F. W. YOUNG.
APPARATUS FOR THE COMMUTATION OF DIRECT CURRENT DYNAMO ELECTRIC MACHINES.
APPLICATION FILED JUNE 26, 1902. RENEWED SEPT. 12, 1904.
2 SHEETS—SHEET 2.
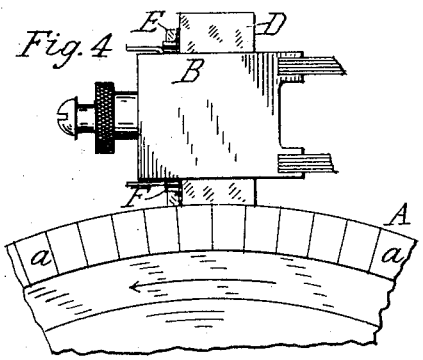
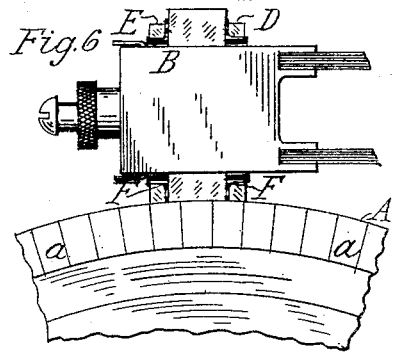
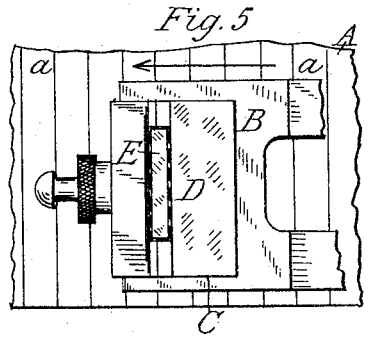
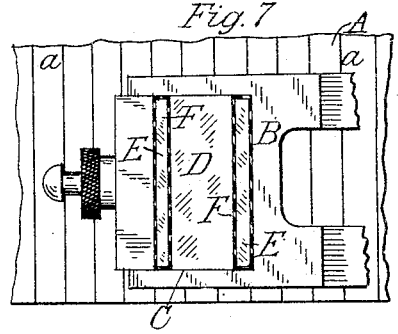
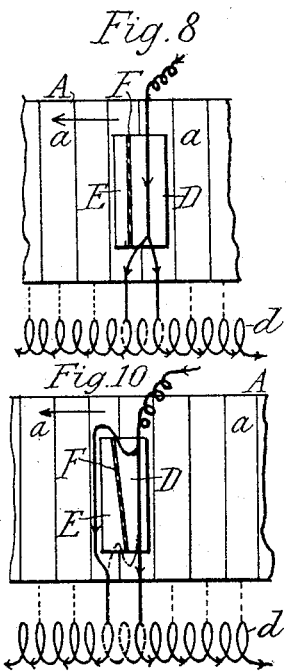
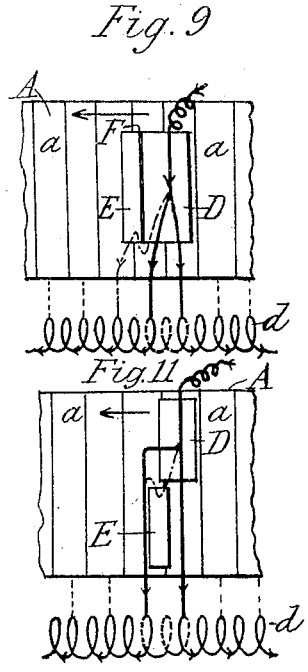
Witnesses:
Edward J. Murphy.
Geo. S. Wheelock.
Inventor:
Frederick W. Young
by Thomas Ewing, Jr.,
Attorney.

No. 783,989. Patented February 28, 1905.

UNITED STATES PATENT OFFICE.

FREDERICK WM. YOUNG, OF AMPERE, NEW JERSEY, ASSIGNOR TO CROCKER-WHEELER COMPANY, OF AMPERE, NEW JERSEY, A CORPORATION OF NEW JERSEY.

APPARATUS FOR THE COMMUTATION OF DIRECT-CURRENT DYNAMO-ELECTRIC MACHINES.

SPECIFICATION forming part of Letters Patent No. 783,989, dated February 28, 1905.

Original application filed April 17, 1902, Serial No. 103,376. Divided and this application filed June 26, 1902. Renewed September 12, 1904. Serial No. 224,182.

*To all whom it may concern:*

Be it known that I, FREDERICK WM. YOUNG, a citizen of the United States of America, and a resident of Ampere, East Orange, Essex county, State of New Jersey, have invented certain new and useful Improvements in Apparatus for the Commutation of Direct-Current Dynamo-Electric Machines, of which the following is a specification.

The object of my invention is to improve the present method of commutation in dynamo-electric machines.

The method disclosed in this application is claimed in a copending application filed April 17, 1902, Serial No. 103,376, of which the present application is a division.

My invention consists in the employment of a live or working brush connected to the line and a dead or detached brush insulated from the live brush, the brushes being so arranged that current can reach a coil through the dead brush only by passing from a commutator-bar into the dead brush and then from the dead brush into another commutator-bar.

In the accompanying two sheets of drawings, which form a part of this specification, Figure 1 is a side elevation showing portions of a commutator and a brush-holder with my improved brush applied. Fig. 2 is a plan view of the same parts. Fig. 3 is a modification in plan in which the insulation between the live and the dead brushes is shown on the bias with respect to the insulation between the commutator-bars. Fig. 4 is a side elevation, and Fig. 5 is a plan of a further modification in which the dead brush is considerably reduced in size. Fig. 6 is a side elevation, and Fig. 7 a plan of another modification in which the invention is shown as applied to a reversing-motor with a detached brush arranged on each side of the working brush. Figs. 8 and 9 are diagrams of operation of the form of the invention shown in Figs. 1 and 2, Fig. 8 showing a position of the commutator in which the detached brush is inactive and Fig. 9 showing a position of the commutator in which the detached brush is working in conjunction with the live brush to prevent sparking or to cause quick reversal of the commutating-coil. Fig. 10 is a diagrammatic view of the construction shown in Fig. 3, showing how the current flows when the detached brush is coming into action; and Fig. 11 is a plan view, partly diagrammatic, showing a further modification in which the detached brush is shown as alongside and partly overlapping the working brush.

Referring to Figs. 1, 2, 8, and 9 in particular, the commutator A is supposed to revolve in the direction of the arrow. The brush-holder B of any suitable construction supports a brush in its socket C. The ordinary brush D, of carbon or graphite or other suitable material, is supported in the socket as usual, so that its contact-surface will form proper electrical contact with the commutator-bars $a$, which are properly connected with the commutating-coils $d$. Located in the socket C on the trailing side of the live brush D is another brush E, of carbon or graphite or other suitable material, which is insulated from it by a suitable insulation F—such as a sheet of mica, paper, or other equivalent insulation—which is wrapped around and incloses the brush E. This brush E is insulated not alone from the live brush and its holder, but from every other part of the machine, so that it is completely dead excepting for its contact with the commutator-bars. Hence it is called a "dead" brush.

For the sake of clearness it is herein assumed that the current flows from the brush into the coil. The performance of a single brush, such as the live brush of any one of the drawings, will first be described briefly. The coils approaching such a brush carry a current which is equal and opposite in direction to the current in the coils receding from the brush. The coils are in turn short-circuited in passing the brush, and the object of commutation is to reverse the current in the coils as they pass the brush and build up the current in the opposite direction, so that at the moment when any coil is injected into the path of the current through the receding coils there shall be no disturbance. The object of the present invention is to increase the resistance in the path of the current from the live brush into the advancing terminal of the commutating-coil without increasing the resistance between the live brush and the trailing terminal of the commutating-coil, so that the reversal of the coil may be facilitated.

The characteristic feature of the present invention is that the current that flows into a commutator-bar through the dead brush passes through three contact-surfaces in series. These surfaces are, first, the surface between the live brush and the commutator-bar under it; second, a surface between this commutator-bar and the dead brush, and, third, a surface between the dead brush and the commutator-bar next removed from the first-named bar. In Fig. 8 it will be seen that the current is flowing only through the live brush, while in Fig. 9 it will be seen that the current is not only flowing through this brush, but a circuit is completed through the detached or dead brush, through the commutator-bar which has just passed the working brush and the commutator-bar that bridges the two brushes—that is to say, the current passes from the live brush into a commutator-bar, then into the dead brush, and then into the next commutator-bar to the left. The dead brush must be insulated from the live brush to an extent sufficient to compel the commutating-current to pass into and again out of the commutator-bar when both brushes are in contact therewith. In actual running the junction between the dead brush and the live brush may at times become clogged with carbon dust and serve to make a partial connection between the two brushes. If this connection becomes good enough to permit an important portion of the commutating-current to pass between the brushes without first dipping into and then rising out of the commutator-bar under the junction, the dead brush becomes practically a part of the live brush and its distinctive advantage is lost. In practice, however, with the form of the invention shown in Figs. 1, 2, 9, and 10 or the equivalent, the amount of carbon dust that gets worked in between the two brushes as a result of the sandpapering to seat the brushes upon the commutator and wear only serves to bridge this gap sufficiently to prevent an instant of absolute rupture of the commutating-current when the trailing side of the live brush leaves a commutator-bar, thereby avoiding a spark or burning of the bar. To provide structurally against such rupture, the plane of separation between the brushes and the plane of separation between the commutator-bars may be inclined relatively to each other, as indicated in Figs. 3 and 10, or the two brushes may overlap, as indicated in Fig. 11.

In Figs. 6 and 7 two dead brushes E E are shown arranged at opposite sides of a live brush B. With this arrangement the commutation will take place under the conditions here indicated with the armature revolving in either direction.

Obviously the dead brush need not be supported in the same socket as the working brush. The brushes may be arranged in separate holders properly located relatively to each other.

It will be seen from the foregoing that with the brushes constructed as described two brush and commutator surface contacts are introduced into the circuit between the live brush and the advancing terminal of a coil just before the coil is injected into the path of the current through the receding coils. This position of the commutating-coil is illustrated diagrammatically in Figs. 9, 10, and 11; but in Fig. 10, owing to the slanting of the brushes, and in Fig. 11, owing to the overlapping of the brushes, the leading terminal of the coil in question is not at the instant illustrated yet cut off from direct connection with the live brush. This is effected by slight revolution of the commutator.

Without limiting myself to the details shown, what I claim as new, and desire to secure by Letters Patent, is—

1. In a brush for dynamos or motors, the combination of a live brush and a dead brush, substantially as described.

2. In a brush for dynamos or motors, the combination of a live brush, and a separate brush insulated from the live brush and from every part of the machine, excepting where in contact with the commutator-bars, substantially as described.

3. The combination of a live brush, and a dead brush on each side of the live brush, substantially as described.

Signed by me at Ampere, New Jersey, this 20th day of June, 1902.

FREDERICK WM. YOUNG.

Witnesses:
    F. V. HENSHAW,
    H. J. FULLER.